Oct. 14, 1924. 1,511,407
W. E. KNERR
TRUCK ATTACHMENT
Filed Jan. 24, 1924
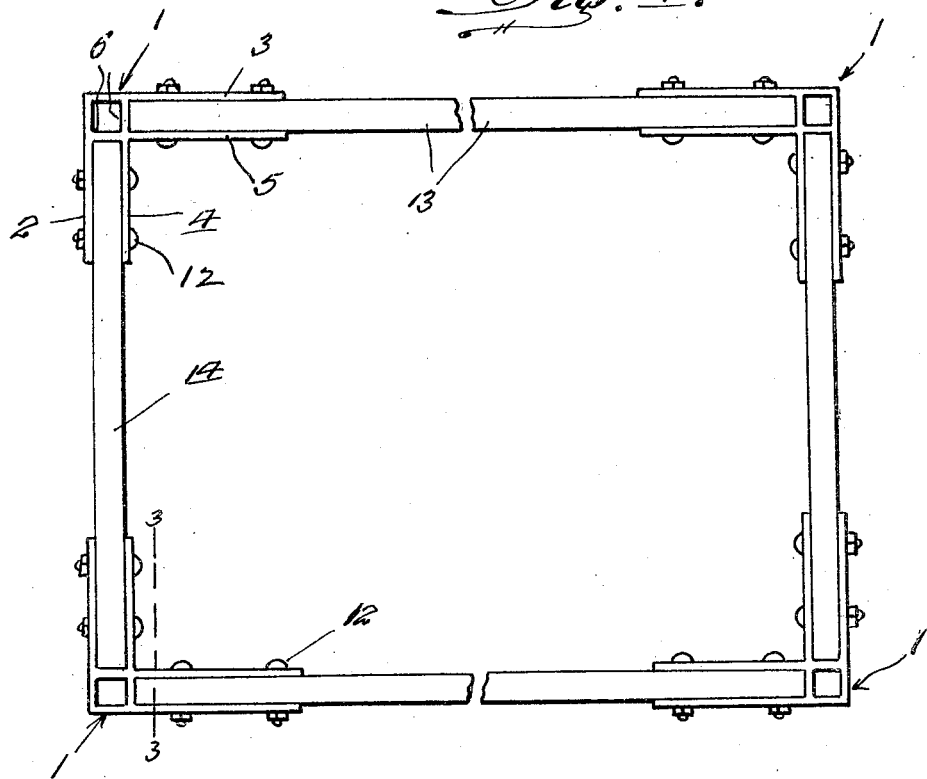
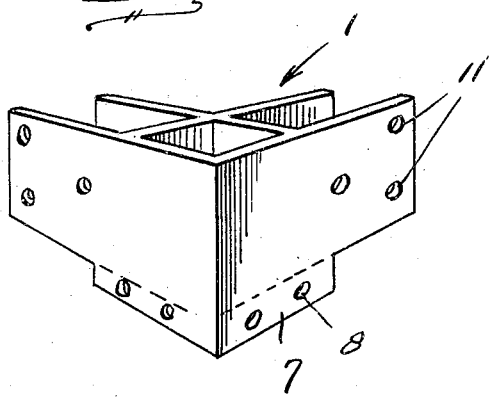
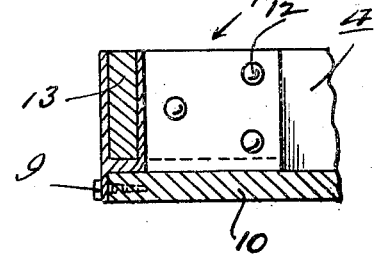
W. E. Knerr,
INVENTOR.
BY
ATTORNEYS.

Patented Oct. 14, 1924.

1,511,407

UNITED STATES PATENT OFFICE.

WILLIAM E. KNERR, OF WILLIAMSPORT, PENNSYLVANIA, ASSIGNOR OF ONE-FOURTH TO EDWARD H. JONES, OF WILLIAMSPORT, PENNSYLVANIA.

TRUCK ATTACHMENT.

Application filed January 24, 1924. Serial No. 688,193.

*To all whom it may concern:*

Be it known that I, WILLIAM E. KNERR, a citizen of the United States, residing at Williamsport, in the county of Lycoming and State of Pennsylvania, have invented certain new and useful Improvements in Truck Attachments, of which the following is a specification.

This invention relates to improvements in attachments for trucks particularly designed for use in connection with industrial trucks used in manufacturing plants.

An object of the invention is to provide means for conveniently assembling and supporting side and end pieces at the edges of a truck platform adapted for cooperation therewith to form a body, so that small castings, packages and the like may be carried on the truck and prevented from falling off during transportation.

Another object of the invention is to provide a plurality of bracket members having the sections thereof arranged to provide strength and rigidity adapted to receive side and end members for securing said members in assembled body forming relation, and also for mounting these members at the edges of a truck platform.

The invention comprehends other objects and advantages in the details of construction of the bracket, more particularly described in the following specification and claim, directed to a preferred form of the invention, it being understood however, that slight variations may be made in the construction and relation of the parts within the scope of the present description and claim.

In the drawing, forming a part of this application,

Figure 1 represents a plan view of side and end members held in assembled body forming relation by the bracket forming the subject matter of the present invention.

Figure 2 is a perspective view of one of the brackets.

Figure 3 is a detail view showing the manner of securing the bracket to the corners of the truck platform.

1 indicates generally the bracket members formed with outer flanges 2 and 3 arranged at right angles to one another and in spaced relation with which are inner flanges 4 and 5 which are parallel to the flanges 2 and 3 respectively and also arranged substantially at right angles. The flanges 4 and 5 each have web extensions 6 formed integral with the flanges 2 and 3 at spaced intervals from the corners formed thereby, the resulting sections forming a quadrilateral at the corner portion of the bracket and the juncture of the outer and inner flanges respectively to provide rigidity throughout the extent of the bracket so that a substantially light yet strong bracket member is produced. An angular depending flange is provided at the outer corner of the bracket as indicated at 7, which is formed with a plurality of openings 8 adapted to receive the screws or other fastening means 9 for securing the bracket to the corner portion of an industrial truck platform indicated at 10, in Figure 3.

The flanges 2 and 4 and the flanges 3 and 5 respectively are each formed with a plurality of aligned openings 11 for the reception of fastening bolts 12 adapted for securing the side and end members 13 and 14 respectively between corresponding flanges of each of the end brackets as illustrated in Figure 1, a bracket being used at each corner of the truck.

It is to be noted that the extension 6 from the inner flanges 4 and 5 serve to direct lateral stress from the side and end members directly to one another without producing an appreciable thrusting action on the bracket due to the hollow quadrilateral section of the corner portion thereof which is occasioned by the web 6. The body for the truck may be retained in assembled relation as shown in Figure 1, and may be removably placed on the truck platform 10 as clearly indicated in Figure 3, either the side or end members being adapted for replacement without disassembling the whole truck body, but by merely removing the bolts 12 securing the member in the corresponding bracket to permit its removal therefrom.

It is also to be noted that the bolts extend through the side and end members from the inside to the outer side thereof where they receive the cooperating nuts for securing the parts together. This permits of the ready removal of the nuts when it is desired to disassemble the body.

It will therefore be apparent from the above description that a simple, inexpensive, and efficient bracket member has been provided for forming and securing the side and end portions of a truck body together and to the truck platform.

What is claimed is:

A corner bracket for a truck attachment comprising a body having a rectangular corner portion which is open from end to end and provided at the lower portions of its outer sides with angularly disposed flanges which merge with each other at the corner of the said portions, the said corner portion being provided at its inner side with spaced parallel flanges, there being a bottom wall flush with the lower end of the corner portion which bridges the space between the last mentioned flanges.

In testimony whereof I affix my signature.

WILLIAM E. KNERR

Certificate of Correction.

It is hereby certified that the name of the assignee in Letters Patent No. 1,511,407, granted October 14, 1924, upon the application of William E. Knerr, of Williamsport, Pennsylvania, for an improvement in "Truck Attachments," was erroneously written and printed as "Edward H. Jones," whereas said name should have been written and printed as *Edward H. Jones*, as shown by the record of assignments in this office; and that the said Letters Patent should be read with this correction therein that the same may conform to the record of the case in the Patent Office.

Signed and sealed this 30th day of March, A. D. 1926.

[SEAL.]

M. J. MOORE,
*Acting Commissioner of Patents.*